Oct. 3, 1967 M. HIMMEL 3,344,949
TOPS FOR COFFEE PERCOLATOR LIDS AND THE LIKE ARTICLES
Filed Oct. 22, 1965

INVENTOR.
MARTIN HIMMEL
BY
J. B. Felshin
ATTORNEY.

United States Patent Office 3,344,949
Patented Oct. 3, 1967

3,344,949
TOPS FOR COFFEE PERCOLATOR LIDS AND THE LIKE ARTICLES
Martin Himmel, 1 Park Lane, Mount Vernon, N.Y. 10552
Filed Oct. 22, 1965, Ser. No. 500,499
12 Claims. (Cl. 220—82.5)

ABSTRACT OF THE DISCLOSURE

A percolator top comprising a transparent hollow top member formed with a top wall and annular walls extending downwardly from the top wall, a bottom wall extending inwardly from the lower end of the annular wall and a central tubular portion extending down from the inner end of the bottom wall. The tubular portion projects through a hole in a coffee pot lid. The bottom wall contacts the top wall of the lid. Within the top member is a chamber disposed directly above the bottom wall with said bottom wall defining the lower end of the chamber. The tubular portion has screw threads and a clamp member screws thereon and engages the underside of the lid so that the top wall of the lid is clamped between said bottom wall and the clamp. The hole in the lid is larger than the tubular portion of the top member so that said top can fit lids of various coffee pots and having various sized holes.

---

This invention relates to tops for coffee percolator lids and the like articles.

One object of this invention is to improve the devices disclosed in my copending application Ser. No. 359,294 filed Apr. 13, 1964, now Patent No. 3,275,186, for Percolator Coffee Pot and Top Therefor.

Another object of this invention is to provide a percolator top of the character described comprising a transparent hollow top member formed with a central tubular downwardly extending stem projecting down through an opening in the lid of a coffee percolator, and clamp means engaging the stem and contacting the underside of the lid, said top member including a chamber having a bottom wall from which said central stem extends, and said bottom wall of said chamber contacting the top of said lid when said top member is clamped by said clamp to said lid.

Another object of this invention is to provide in a percolator top of the character described, a clamp comprising a bottom wall from the periphery of which a flange extends upwardly, and said bottom wall being formed with a central opening to receive said stem therethrough and said bottom wall at said central opening being formed with an upwardly projecting helical edge, of less than 360°, merging with a flat part of the bottom wall at the low end of said helical edge, and said bottom wall having a notch adjacent the high end of said helical thread.

Still another object of this invention is to provide a strong, rugged and durable device of the character described which shall be relatively inexpensive to manufacture, easy to apply and remove, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

In the accompanying drawing, in which is shown an illustrative embodiment of this invention, FIG. 1 is an elevational view of a device embodying the invention with parts broken away and in cross-section;

Figure 1:
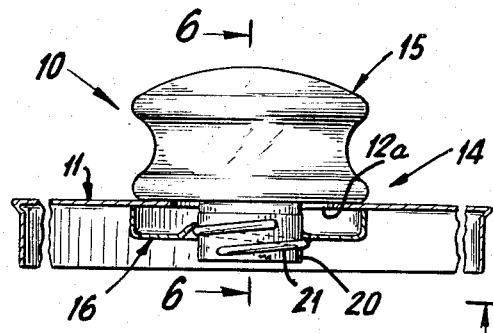
Figure 3:
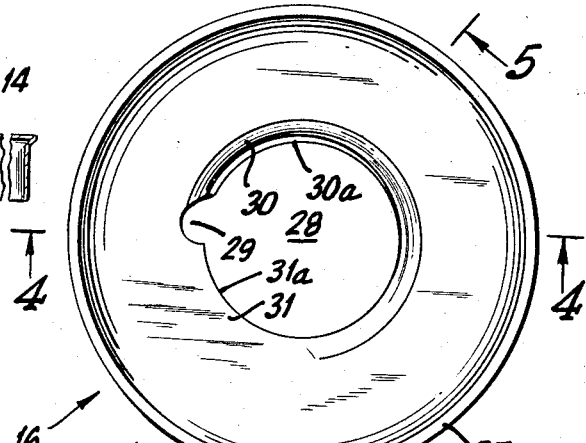
FIG. 3 is a top plan view of the fastening member.
Figure 2:
FIG. 2 is a side elevational view of the fastening member.
Figure 6:
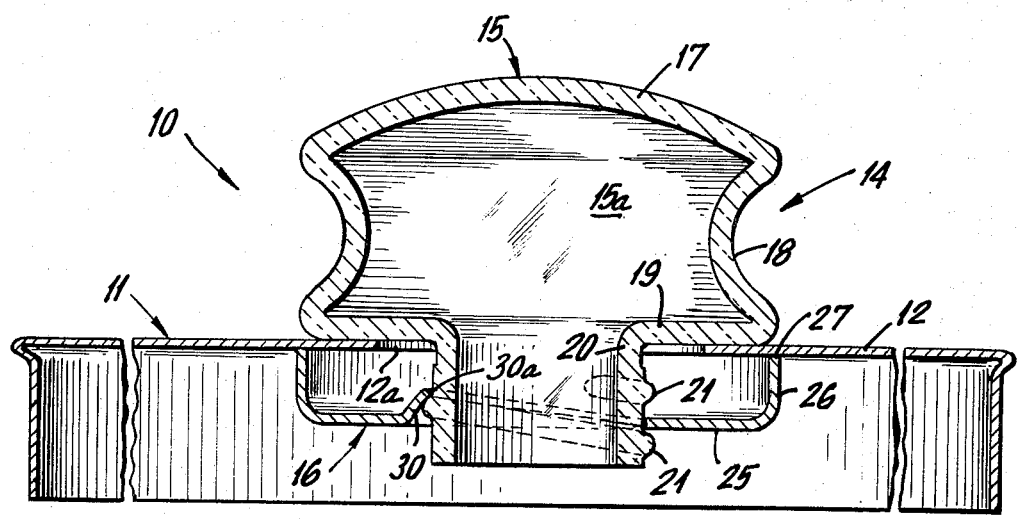
Figure 4:
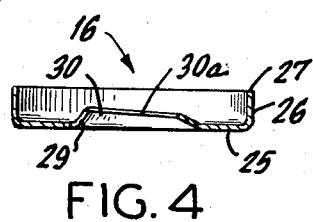
Figure 5:
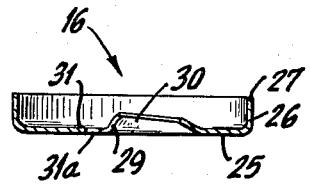

FIGS. 4 and 5 are cross-sectional views taken on lines 4—4 and 5—5 of FIG. 3 respectively; and FIG. 6 is a cross-sectional view taken on line 6—6 of FIG. 1.

Referring now in detail to the drawing, there is shown a device 10 embodying the invention. Device 10 comprises a percolator coffee pot lid 11 of usual construction. Lid 11 comprises a circular top wall 12, formed with a circular, central opening 12a, and having a downwardly extending peripheral flange 13.

Attached to the top wall 12 is a percolator top 14 comprising a hollow transparent top member 15 and a clamp member 16.

Top member 15 comprises an upper, circular, wall 17 which may be convex in shape, a peripheral wall 18 depending downwardly therefrom, a bottom annular wall 19 extending inwardly from the lower end of wall 18, and a tubular stem 20 extending downwardly from the inner periphery of wall 19. Wall 18 may be concave radially inwardly. A chamber 15a is thus formed in the upper portion of top member 15, into which drops of percolated coffee spray in known manner. Top member 15 is preferably made of glass, plastic, or other light transmitting material.

The outside surface of stem 20 has a screw thread 21 formed thereon. Thread 21 may be slightly more than one full turn. Portion 20 is of a relatively small diameter, and wall 19 is of a relatively large diameter. The top 14 may be used as a replacement on percolator lids having a wide range of center opening diameters, so long as said lid center opening is smaller than the diameter of wall 19, and larger than the outside diameter of thread 21.

Fastening or clamp member 16 comprises a flat bottom wall 25, formed with a central opening 28, and an upwardly extending outer annular flange 26 having a top edge 27. Member 16 may be made of aluminum or any other suitable material. Opening 28 is formed with a notch 29. The portion 30 of wall 25 adjacent notch 29 on one side thereof is upwardly offset and has an upper helical edge 30a. The portion 31 of wall 25 on the other side of notch 29 is flat and has an inner edge 31a extending from notch 29 to edge 30a. Edge 30a describes approximately three-quarters of a turn of a screw thread complementary to thread 21 on stem 20.

To assemble top member 15 and clamp member 16 onto a lid 11, portion 20 of top member 15 is first inserted through the opening 12a from the top and centered therein. Then the lower end of thread 21 is passed through notch 29 and the top member 15 and clamp member 16 screwed together until edge 27 bears up against the underside of wall 12. Tightening top member 15 and clamp member 16 together will lock them in place.

The diameter of flange 26 is somewhat less than the outer diameter of bottom wall 19.

It will thus be seen that there is provided an apparatus and article in which the several objects of this invention are achieved, and which is well adapted to meet the conditions of practical use.

As possible embodiments might be made of the above invention, and as various changes might be made in the embodiment above set forth, it is to be understood that all matter herein set forth and shown in the accompanying drawings, is to be interpreted as illustrative and not in a limiting sense.

I claim:

1. In combination with a coffee percolator lid having a central opening, a top for said lid, said top comprising a hollow top member, said top member comprising a top wall, an annular wall extending downwardly from the periphery of the top wall, an annular bottom wall extending inwardly from the lower end of the annular wall and forming a chamber in said top member, having a portion disposed directly above and bounded at its underside by said inwardly extending bottom wall, and a hollow stem extending downwardly from the inner periphery of said bottom wall and projecting down through said lid opening, said bottom wall contacting the upper surface of said lid, clamp engaging means on said stem, said top further comprising clamp means having means cooperable with said engaging means on said stem, to cause said clamp means to press against the underside of said lid to clamp said top member to said lid.

2. The combination of claim 1, said clamp means comprising a clamp member, said clamp member comprising a bottom wall and an annular flange extending upwardly from the outer periphery of said clamp member bottom wall, the diameter of said clamp member flange being substantially equal to the diameter of said top member bottom wall.

3. In combination with a coffee percolator lid having a central opening, a top for said lid, said top comprising a hollow top member, said top member comprising a top wall, an annular wall extending downwardly from the periphery of the top wall, an annular bottom wall extending inwardly from the lower end of the annular wall, and a hollow stem extending downwardly from the inner periphery of said bottom wall and projecting through said lid opening, said bottom wall contacting the upper surface of said lid, clamp engaging means on said stem, said top further comprising clamp means having means cooperable with said engaging means on said stem, to cause said clamp means to press against the underside of said lid to clamp said top member to said lid, said clamp means comprising a clamp member having a bottom wall formed with a circular opening, said engaging means on said hollow stem comprising at least one turn of a screw thread, said clamp member bottom wall being formed with a notch at said opening therein, said clamp member bottom wall at one side of said notch being provided with an upwardly extending portion of a turn of a screw thread complementary to said screw thread on said stem, and said clamp member bottom wall, at the other side of said notch, being in the plane of said clamp member bottom wall.

4. The combination of claim 3, said clamp member further comprising an annular flange extending upwardly from the peripheral edge of said clamp member bottom wall, said flange having an upper edge, said upper edge being in contact with the underside of the lid surrounding said opening in the lid.

5. The combination of claim 1, said top member comprising transparent material.

6. The combination of claim 1, said clamp means comprising aluminum.

7. A coffee percolator top comprising a hollow top member, said top member comprising a top wall, an annular wall extending downwardly from the periphery of the top wall, an annular bottom wall extending inwardly from the lower end of the annular wall and forming a chamber in said top member having a portion disposed directly above and bounded at its underside by said inwardly extending bottom wall, and a hollow stem extending downwardly from the inner periphery of said bottom wall, said stem being adapted to project downwardly through a central opening in a coffee percolator lid with said bottom wall in contact with the upper surface of said lid, said stem being formed with clamp engaging means on the outer surface thereof, said top further comprising clamp means having means cooperable with said engaging means on said stem to cause said clamp means to engage the underside of said lid for clamping said top member and clamp means to said lid.

8. The combination of claim 7, said clamp means comprising a clamp member, said clamp member comprising a bottom wall and an annular flange extending upwardly from the outer periphery of said clamp member bottom wall, the diameter of said clamp member flange being substantially equal to the diameter of said top member bottom wall.

9. A coffee percolator top comprising a hollow top member, said top member comprising a top wall, an annular wall extending downwardly from the periphery of the top wall, an annular bottom wall extending inwardly from the lower end of the annular wall, and a hollow stem extending downwardly from the inner periphery of said bottom wall, said stem being adapted to project downwardly through a central opening in a coffee percolator lid with said bottom wall in contact with the upper surface of said lid, said stem being formed with clamp engaging means on the outer surface thereof, said top further comprising clamp means having means cooperable with said engaging means on said stem to cause said clamp means to engage the underside of said lid for clamping said top member and clamp means to said lid, said clamp means comprising a clamp member having a bottom wall formed with a circular opening, said engaging means on said hollow stem comprising at least one turn of a screw thread, said clamp member bottom wall being formed with a notch at said opening therein, said clamp member bottom wall at one side of said notch being provided with an upwardly extending portion of a turn of a screw thread complementary to said screw thread on said stem, and said clamp member bottom wall, at the other side of said notch, being in the plane of said clamp member bottom wall.

10. The combination of claim 9, said clamp member further comprising an annular flange extending upwardly from the peripheral edge of said clamp member bottom wall, said flange having an upper edge, said upper edge being in contact with the underside of the lid surrounding said opening in the lid.

11. The combination of claim 10, said top member comprising transparent material.

12. The combination of claim 11, said clamp means comprising aluminum.

References Cited

UNITED STATES PATENTS

| | | | |
|---|---|---|---|
| 1,446,709 | 2/1923 | Leyse | 99—285 |
| 1,717,963 | 6/1929 | Denny | 99—312 |
| 1,975,498 | 10/1934 | Billerman | 99—285 |
| 2,046,819 | 7/1936 | Hettinger | 99—285 |
| 2,630,113 | 3/1953 | Zide | 99—285 |
| 3,275,186 | 9/1966 | Himmel | 99—285 |

ROBERT W. JENKINS, *Primary Examiner.*

Disclaimer 3,344,949.—*Martin Himmel*, Mount Vernon, N.Y. TOPS FOR COFFEE PERCOLATOR LIDS AND THE LIKE ARTICLES. Patent dated Oct. 3, 1967. Disclaimer filed Nov. 23, 1973, by the assignee, *Tops Manufacturing Co. Inc.*

Hereby enters this disclaimer to claims 1, 2, 5, 7 and 8 of said patent.

[*Official Gazette February 19, 1974.*]